United States Patent [19]

Fujimoto

[11] Patent Number: 4,893,773
[45] Date of Patent: Jan. 16, 1990

[54] ARTICLE HOLDER FOR USE IN A CAR DOOR

[76] Inventor: Takeo Fujimoto, #A102 Migawa Manshion 85-2, Migawa 2-chome, Mito-shi, Ibaraki-ken, 310, Japan

[21] Appl. No.: 259,289

[22] Filed: Oct. 18, 1988

[30] Foreign Application Priority Data

Mar. 22, 1988 [JP] Japan .............................. 63-37388[U]

[51] Int. Cl.⁴ .............................................. A47K 1/08
[52] U.S. Cl. ................................ 248/311.2; 248/300; 248/215
[58] Field of Search ...................... 248/311.2, 310, 215, 248/340, 217.3, 300; 211/73; 220/85 H; 224/42.45 R, 148, 906

[56] References Cited

U.S. PATENT DOCUMENTS

| | | | |
|---|---|---|---|
| 1,890,682 | 12/1932 | Horwath | 211/73 |
| 1,915,958 | 6/1933 | Skirrow | 211/73 X |
| 1,970,962 | 8/1934 | Hinckley | 224/42.45 R |
| 2,687,836 | 8/1954 | Rhodes et al. | 254/42.45 R |
| 2,805,033 | 9/1957 | Rous | 248/300 X |
| 2,831,647 | 4/1958 | MacKay | 248/311.2 X |
| 3,009,620 | 11/1961 | Leone | 224/906 X |
| 3,031,162 | 4/1962 | Whorton | 248/311.2 X |
| 3,371,900 | 3/1968 | Jacobs | 248/215 X |
| 4,093,547 | 6/1978 | Sherman et al. | 248/215 X |
| 4,678,154 | 7/1987 | McFarland | 248/311.2 |

Primary Examiner—Alvin C. Chin-Shue
Attorney, Agent, or Firm—Flynn, Thiel, Boutell & Tanis

[57] ABSTRACT

An article holder for use in a car door comprises an insertion portion to be inserted in the space between a door glass and an inside door, a lateral holding portion continuing from the insertion member fold at an outside bend line and having a reinforcing member for reinforcing the lateral holding portion, the lateral holding portion having further a support member which can be adjusted by selectively bending at any of the inside fold lines depending on the thickness of the inside door, a tab for fixedly positioning the support member, a longitudinal holding portion continuing from the lateral holding portion, a truncated disc member which is substantially in shape and extends between the lateral holding portion and the longitudinal holding portion, a lateral inside support member provided in the longitudinal holding portion and continuing from the truncated disc member.

The article holder further includes a rubber engagement member at the outside fold lines provided between the insertion portion and the lateral holding portion.

4 Claims, 4 Drawing Sheets

ARTICLE HOLDER FOR USE IN A CAR DOOR

BACKGROUND OF THE INVENTION

1. Field of the Invention

The present invention relates to an article holder for use in a car door which is formed by a piece of material and forms a pocket having an adjustable height when assembled.

2. Prior Art

There has been used a prior art article holder for use in a car door as shown in FIG. 8.

The prior art article holder for use in a car door (hereafter referred to simply as article holder) is formed by a piece of sheet material having four lines to be bent in the lateral direction thereof. The prior art article holder comprises an insertion member 1, which is inserted between a window and the gap provided between the window and the inside door, for supporting the article holder, a hanging lateral member 19, bent at a first line, hung over the upper portion of the inside door shown in the figure and having slits 23 at locations close to both sides thereof, a longitudinal supporting member 20 bent at a second line and having separable pieces 22 at both sides thereof which separate at cut lines lines provided at both sides of the longitudinal supporting member 20, extend upward at desired angle and are inserted in slits 23 at the tip ends thereof, a lateral holding member 5 bent at a third line for holding an article thereon and having slits 23 at locations close to both sides thereof, a longitudinal auxiliary member 21 bent at a fourth line and having separable pieces 22 at both sides thereof which separate at cut lines provided at both sides of the lontitudinal auxiliary member 21, and extend upward at a desired angle and are inserted in slits 23 at the tip ends thereof.

The prior art article holder, constituted by a piece of sheet material, has problems in that it can only hold small sized and light articles such as small sized road maps or driving gloves. There is another problem in that it can not securely hold the article and will drop the article therefrom due to vibration during driving. There is still another problem in that the lateral and lengthwise size of the article holder can not be reduced for keeping the holding forth so that the usage thereof is limited in view of the positions for the armrest or a regulating handle. Especially for the portable article holder, it is a current tendency to reduce the size thereof since the height of the automobile is reduced which thereby reduces the distance between a ceiling and the seats.

SUMMARY OF THE INVENTION

It is therefor an object of the present invention to provide an article holder for use in a car door (hereafter referred to as simply article holder) that solves the problems of the prior art.

It is another object of the present invention to provide an article holder to be easily assembled with a small number of fold lines.

It is further object of the present invention to provide an article holder which is adjustable in the height thereof irrespective of the thickness of the door.

It is still further object of the present invention to provide an aritcle holder enabling the prevention of an article from being dropped from the article holder.

The objects of the present invention will be achieved by providing an article holder made of a piece of sheet material which comprises an insertion portion to be inserted in the space between a door glass and an inside door and having an engagement member provided at substantially the middle portion thereof for fixing the article holder in the space between a window and the inside door to prevent the article holder from slipping, a lateral holding portion continuing from the insertion portion and bent at an outside fold line and having a reinforcing member for reinforcing the lateral holding portion, the lateral holding portion further having a support member which can be adjusted by selectively bending at any of its inside fold lines depending on the thickness of the inside door, a tab for fixedly positioning the support member, a longitudinal holding portion, a truncated disc member having a predetermined diameter and which is substantially circular in shape and extends between the lateral holding portion and the longitudinal holding portion, an inside lateral article support member provided at the longitudinal holding portion and continuing from the truncated disc member.

The above and other objects, features and advantages of the present invention will become more apparent from the following description taken in conjunction with the accompanying drawings.

PREFERRED EMBODIMENT OF THE PRESENT INVENTION

Figure 1:
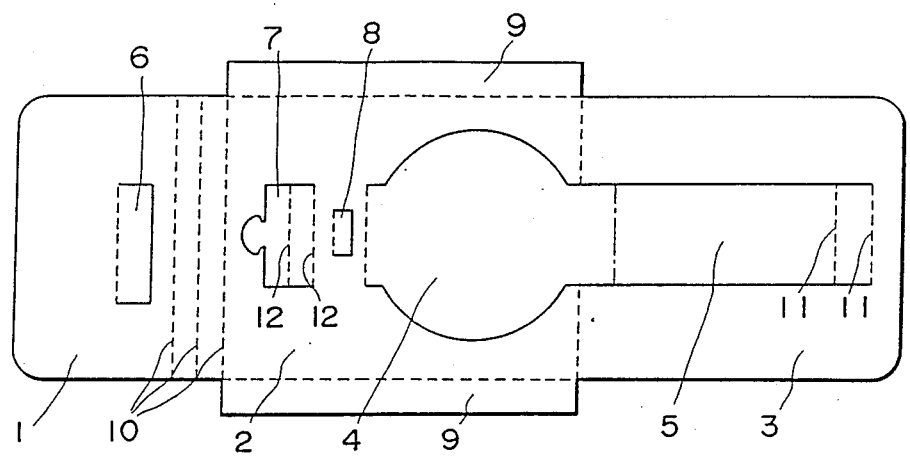
FIG. 1 is a plan view of an article holder for use in a car door according to a first embodiment of the present invention.
Figure 2:
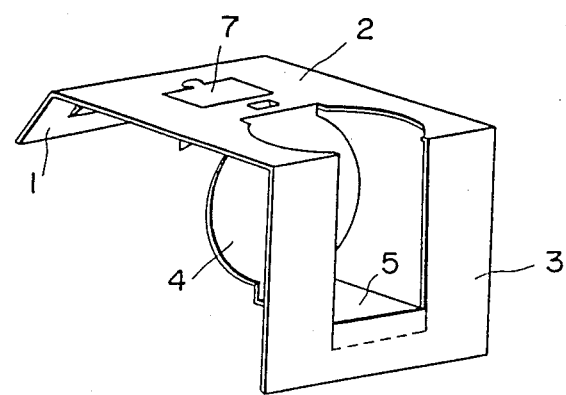
FIG. 2 is a perspective side view of the article holder in FIG. 1 when assembled.

First, second and third embodiments of the present invention will be described in detail with reference to the accompanying drawings.

An article holder according to a first embodiment of the present invention will be described with reference to FIGS. 1 through 4.

An article holder for use in a car door (hereafter referred to simply as article holder) is formed by a piece of sheet material such as a thick paper and preferably has a thickness of 0.3 mm to 1.0 mm. The thickness can be varied depending on the material of the holder or the articles to be held. The article holder comprises an insertion portion 1 to be inserted in the space between a window 15 and an inside door 16 and has an engagement member 6 provided at substantially the middle thereof for fixing the article holder in the space between the window 15 and the inside door 16 to prevent the article holder from sliding, a lateral holding portion 2 extends from the insertion portion 1 and is fold at an outside bend line 10 and has a reinforcing member 9 provided at both sides thereof for reinforcement of the lateral holding portion 2. The lateral holding portion 2 further has a support member 7 which can be adjusted by selectively bending any of the inside fold lines 10 depending on the thickness of the inside door 16, and a tab 8 for fixedly the support member 7, a longitudinal holding portion 3 continuing from the lateral holding portion 2, a truncated member 4 which is substantially in circular shape with a diameter of 6 to 8 cm and extends between the lateral holding portion 2 and the longitudinal holding portion 3, and a lateral inside article support member 5 provided in the longitudinal holding portion 3 and continuing from the truncated disc member 4.

The article holder is assembled in the manner that firstly the components set forth above are bent along each fold line, secondly the truncated disc member 4 and the lateral article support member 5 are separated along the inside cut lines extending to the periphery of the truncated disc member 4 and the lateral support member 5, then the reinforcing member 9 is bent inside and adhered to the lateral holding portion 2.

Figure 3:
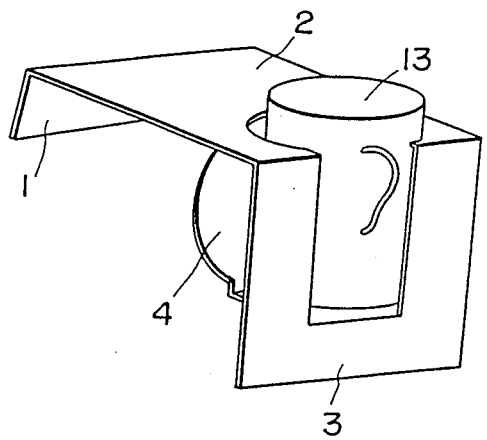
FIG. 3 is a perspective side view of the article holder in FIG. 2 when a cup is kept on the article holder.
Figure 4:
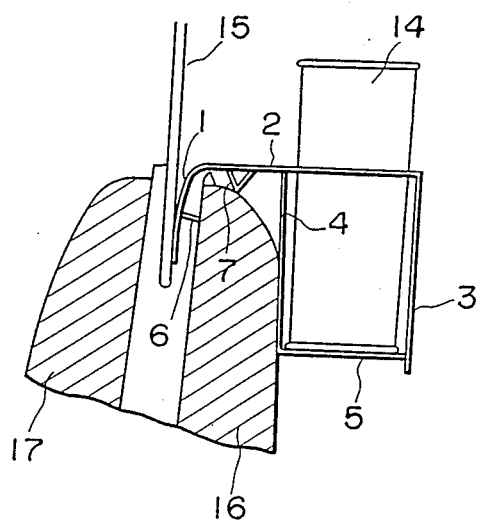
FIG. 4 is a partly cutaway cross sectional view of the article holder in FIG. 2 when mounted on a car door.

The article holder thus assembled receives a cup 13 on the lateral article support member 5, and the circular shaped truncated disc member 4 and the longitudinal holding portion 3 prevent the cut 13 from being moved and dropped from the article holder as shown in FIG. 3.

When the article holder is mounted on the car door, the insertion member 1, together with the engagement member 6, are inserted between the window 15 and the space provided between the gap and the inner door. The engagement member 6 presses the article holder against the window 15 to prevent the article holder from slipping out the inner door 16. The lateral holding portion 2 is bent along one of the outer fold lines 10 and the fixed piece 7 is bent along one of the fold lines 12 respectively, depending on the the thickness of inner door, and fixedly positioned the tab 8 so that an article 14 such as canned drinks can be held horizontally especially when the inner door 16 is thin or inclined to some degree relative to the earth. Furthermore, the horizontal holding of the article is stabilized by selectively bending the lateral inside article support member 5 along one of the outer fold lines 11 depending on the height of the article 14. Therefore, the cup in which the drinks are contained and the opened can can be held. An article having a low height can also be held stably.

An article holder according to a second embodiment of the present invention will be described with reference to FIGS. 5 and 6.

Figure 5:
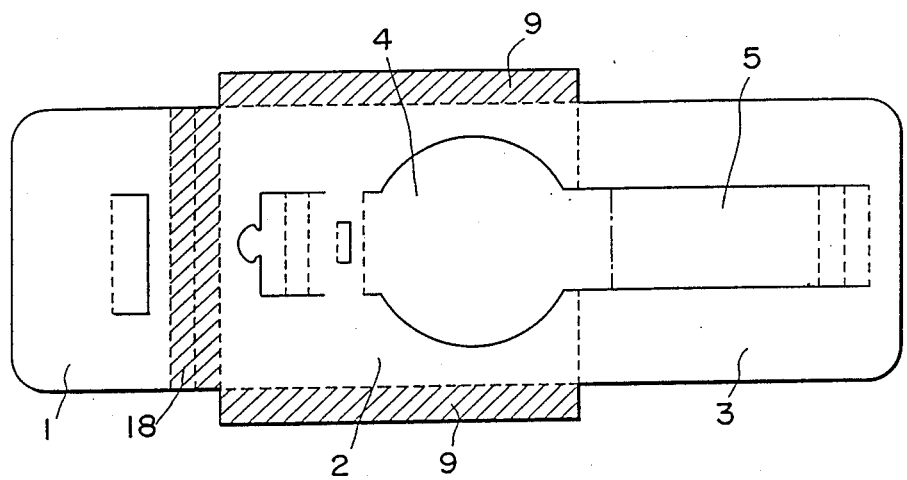
FIG. 5 is a plan view of an article holder for use in a car door according to a second embodiment of the present invention.
Figure 6:
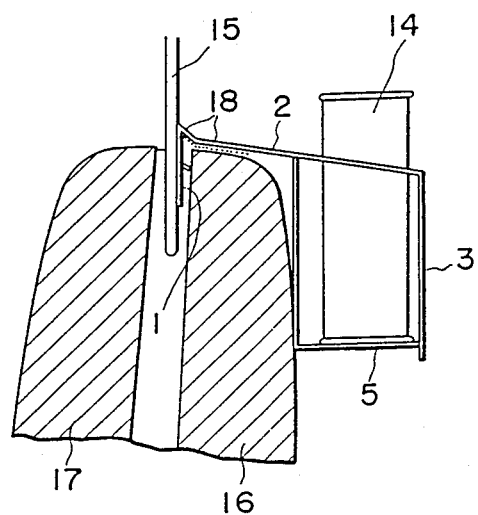
FIG. 6 is a partly cutaway cross sectional view of the article holder in FIG. 5 when mounted on a car door.

The article holder in the second embodiment is the same as that in the first embodiment except that adhesive tape having a releasable sheet is provided at the portion hatched in FIG. 5.

When the article holder is mounted on the car door, the insertion portion 1 is inserted in the space between the window 15 and the inner door 16. When the inner door 16 is thick, the hatched portion 18 corresponding to outer fold lines 10 in the first embodiment is used as an extension of the lateral holding portion 2 to be hung over the upper portion shown in the figure of the inner door 16.

If the thickness of the inner door 16 is greater than the width of the lateral holding portion 2 and the hatched portion 18 as its extension, the releasable sheet is peeled off to adhesively fix the article holder to the inner door 16 at the portion of the hatched portion 18 so that the holding force of the article holder is reinforced.

Furthermore, if the adhesive tape is provided at the backside of the reinforcing member 9, the reinforcing member 9 is easily adhered to the lateral holding portion 2 by simply peeling off the releasable sheet.

Figure 7:
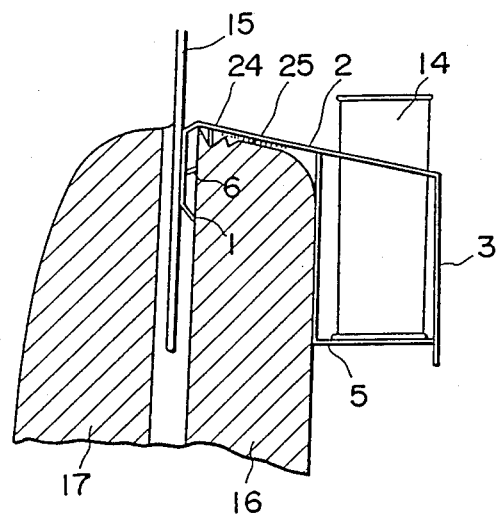
FIG. 7 is a partly cutaway cross sectional view of an article holder for use in a car door in a third embodiment of the present invention mounted on a car door.
Figure 8:
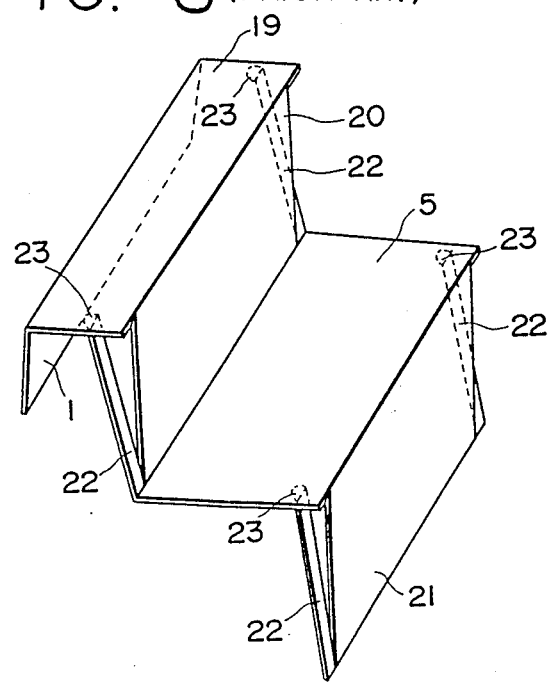
FIG. 8 is a perspective view of a prior art article holder.

An article holder according to a third embodiment of the present invention will be described with reference to FIG. 7.

Some cars employ an inside door made of a rubber having grooves provided on the upper portion of the inside door shown in the figure. An article holder to be mounted on such the inside door requires a stopper for rubber. The third embodiment has been made to meet this requirement.

An article holder of the third embodiment is the same as those of the first and second embodiments except that a rubber engagement member 24 is provided at the portion corresponding to the outside fold lines 10 in the first embodiment. When the rubber engagement member 24 is provided in the article holder of the second embodiment, the rubber engagement member 24 is placed at the portion hatched at 18 and the adhesive tape is provided at the right side of the rubber engagement member 24 in the figures. The number of rubber engagement members 24 is dependent on the number of grooves provided on the inside door. When the article holder with such an arrangement is assembled and mounted on the car door, the rubber engagement member 24 is positioned at the grooves of the inner door. In the article holder both the rubber engagement member 24 and the adhesive tape, the rubber engagement member 24 is positioned at the groove and the adhesive tape is adhered on the upper portion of the inside door to obtain more reinforcing force.

As evident from the article holder according to the first, second, and third embodiments of the present invention, the article holder made of a piece of sheet material is constructed with a small number of fold lines so that it can be easily assembled with low cost. The article, holder can retain small articles such as notions, as well as canned drinks and cups for drinks. Inasmuch as the article holder is provided with an engagement member at the insertion portion to be inserted between the window and the gap between the window and the inside door so that the article holder is prevented from being dropped from the car door. Furthermore, inasmuch as the adhesive tape is provided at the outside fold lines between the insertion portion and the lateral holding portion and the backside of the reinforcing member, the article can be held safely on the article holder. The lateral holding portion, where the load of the article is applied thereto, is double structured by providing the reinforcing member so that its strength is remarkably improved.

The height of the article holder can be adjusted by the outside fold portion provided between the insertion member and the lateral holding portion and by the outside fold portion of the longitudinal holding portion so that the article can be horizontally retained on the article holder.

The article holder can embrace the article so that the article is prevented from being dropped from the article holder.

Although the invention has been described in its preferred form with a certain degree of particularity, it is to be understood that many variations and changes are possible in the invention without departing from the scope thereof.

What is claimed is:

1. A collapsible article holder for use in a car door comprising:

a strip of sheet material having an insertion portion, a lateral holding portion and a longitudinal holding portion; said insertion portion being adapted for insertion between a window and an inside surface of said car door and having an engagement member provided at a central portion thereof, said engagement member being defined by a plurality of cut-lines and a fold-line and adapted for engagement with said inside surface of said car door so as to force said insertion portion into contact with said window, said insertion portion being joined to said lateral holding portion through a plurality of fold-lines, said plurality of fold-lines serving as means for adjusting the location of said engagement member inside said car door; said lateral holding portion being adapted to extend in a lateral direction away from said car door and comprises a support member and a truncated disc member, said support member having at least one fold-line provided therein and a tab portion adapted for insertion into a slit provided in said lateral holding portion to fixedly secure said support member in a desired position, said support member additionally being adapted for engagement with an upper surface of said car door at a fold-line provided therein and support said lateral holding portion thereon, said truncated disc member being defined by fold-lines provided at a forward and rearward portion thereof and a plurality of cut-lines joining said fold-lines and adapted to form an opening in said lateral holding portion said truncated disc member being joined to said lateral holding portion at said forward portion fold-line when said truncated member is disposed in a vertical position, said lateral holding portion being joined to said longitudinal holding portion by a pair of fold-lines; said longitudinal holding portion having a lateral article support member defined therein, said lateral article support member being defined by said truncated disc rearward portion fold-line, at least one lateral article support member rearward portion fold-line and a pair of cut-lines and forming a lateral support surface when said truncated disc member is disposed in said vertical position.

2. An article holder for use in a car door according to claim 1, wherein a rubber engagement member is provided at the outside fold lines between the insertion portion and the lateral holding portion.

3. The collapsible article holder of claim 1, wherein said lateral holding portion has a reinforcing member provided on both sides thereof.

4. An article holder for use in a car door according to claim 3, wherein an adhesive tape having a releasable sheet is provided at outside fold lines between the insertion portion and the lateral holding portion, and at the backside of the reinforcing member.

* * * * *

UNITED STATES PATENT AND TRADEMARK OFFICE
CERTIFICATE OF CORRECTION

PATENT NO. : 4 893 773

DATED : January 16, 1990

INVENTOR(S) : Takeo FUJIMOTO

It is certified that error appears in the above-identified patent and that said Letters Patent is hereby corrected as shown below:

Column 6, line 7; after "truncated" insert ---disc---.

Signed and Sealed this

Eleventh Day of December, 1990

*Attest:*

HARRY F. MANBECK, JR.

*Attesting Officer*  *Commissioner of Patents and Trademarks*